United States Patent
Scherlen et al.

(10) Patent No.: US 12,313,917 B2
(45) Date of Patent: *May 27, 2025

(54) METHOD FOR DETERMINING A FILTER FOR AN OPHTHALMIC LENS AND OPHTHALMIC LENS COMPRISING SUCH A FILTER

(71) Applicant: Essilor International, Charenton le Pont (FR)

(72) Inventors: Anne-Catherine Scherlen, Charenton le Pont (FR); Adele Longo, Charenton le Pont (FR)

(73) Assignee: Essilor International, Charenton-le-Pont (FR)

( * ) Notice: Subject to any disclaimer, the term of this patent is extended or adjusted under 35 U.S.C. 154(b) by 49 days.

This patent is subject to a terminal disclaimer.

(21) Appl. No.: 17/935,759

(22) Filed: Sep. 27, 2022

(65) Prior Publication Data

US 2023/0050368 A1 Feb. 16, 2023

Related U.S. Application Data

(63) Continuation of application No. 16/809,793, filed on Mar. 5, 2020, which is a continuation of application (Continued)

(30) Foreign Application Priority Data

Jan. 16, 2015 (FR) ....................................... 1550383

(51) Int. Cl.
*G02C 7/02* (2006.01)
*G02C 7/10* (2006.01)

(52) U.S. Cl.
CPC ............... *G02C 7/027* (2013.01); *G02C 7/10* (2013.01)

(58) Field of Classification Search
CPC .... G02B 3/032; G02B 3/1208; G02B 3/1015; G02B 3/1225; G02C 7/061; G02C 7/02;
(Continued)

(56) References Cited

U.S. PATENT DOCUMENTS

| 7,597,442 B2 | 10/2009 | Biver et al. |
| 2012/0307194 A1 | 12/2012 | Croft et al. |
| 2014/0211166 A1 | 7/2014 | Scherlen et al. |

FOREIGN PATENT DOCUMENTS

| CN | 101278222 A | 10/2008 |
| CN | 201331632 Y | 10/2009 |

(Continued)

OTHER PUBLICATIONS

International Search Report and Written Opinion of the International Searching Authority for PCT/FR2016/050065, dated Mar. 17, 2016, 24 total pages.

(Continued)

*Primary Examiner* — Jie Lei
(74) *Attorney, Agent, or Firm* — NIXON & VANDERHYE, PC

(57) ABSTRACT

Disclosed is a method for determining a filter for an ophthalmic lens to be placed in front of the eye of the wearer, the filter being able to improve or maintain the visual comfort and/or the visual performances of the wearer. The determination method includes: a step of measuring a variable representative of sensitivity of the eye or both eyes of the wearer to a characteristic light flow, and a step of determining at least one optical characteristic of the filter according to the representative variable measured.

27 Claims, 5 Drawing Sheets

Related U.S. Application Data

No. 15/543,795, filed as application No. PCT/FR2016/050065 on Jan. 14, 2016, now Pat. No. 10,613,346.

(58) Field of Classification Search
CPC .......... G02C 7/10; G02C 7/027; G02C 7/101; G02C 7/12; G02C 7/08
USPC ............. 351/159.6, 213, 239, 221, 243, 246
See application file for complete search history.

(56) References Cited

FOREIGN PATENT DOCUMENTS

| | | |
|---|---|---|
| WO | 01/82791 A1 | 11/2001 |
| WO | 2013/021102 A1 | 2/2013 |
| WO | 2014/079574 A1 | 5/2014 |
| WO | 2014/174067 A1 | 10/2014 |

OTHER PUBLICATIONS

Office Action issued in Chinese Patent Application No. 201680005923.3 dated Oct. 26, 2018.
Rosenblum et al., "Spectral filters in low-vision correction", Ophthalmic and Physiological Optics, Pergamon Press, 2000, XP-001004552, vol. 20, No. 4, pp. 335-341.
Stringham et al., "Macular Pigment and Visual Performance in Glare: Benefits for Photostress Recovery, Disability Glare, and Visual Discomfort", Investigative Ophthalmology & Visual Science, Sep. 2011, vol. 52, No. 10, pp. 7406-7415.

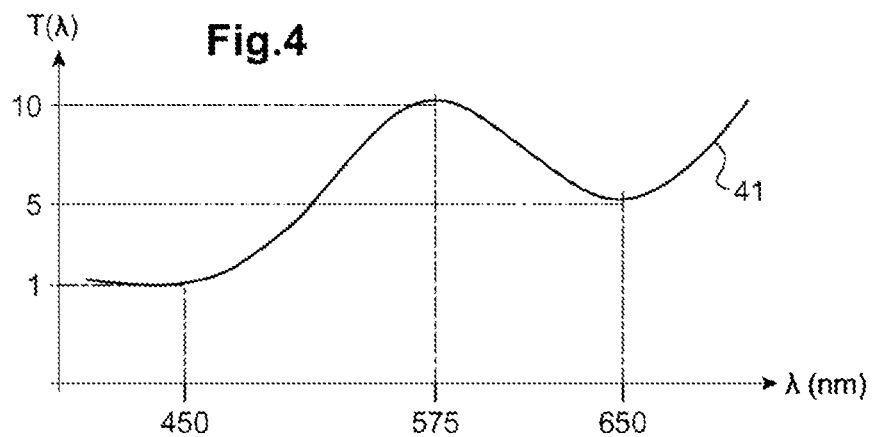
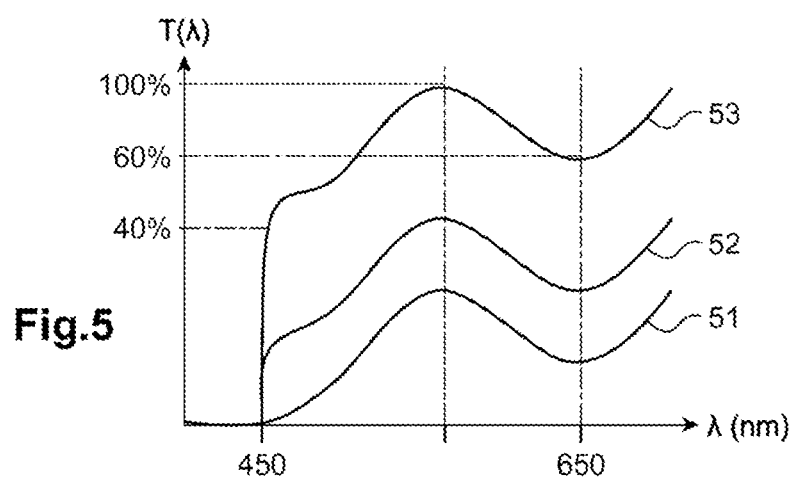
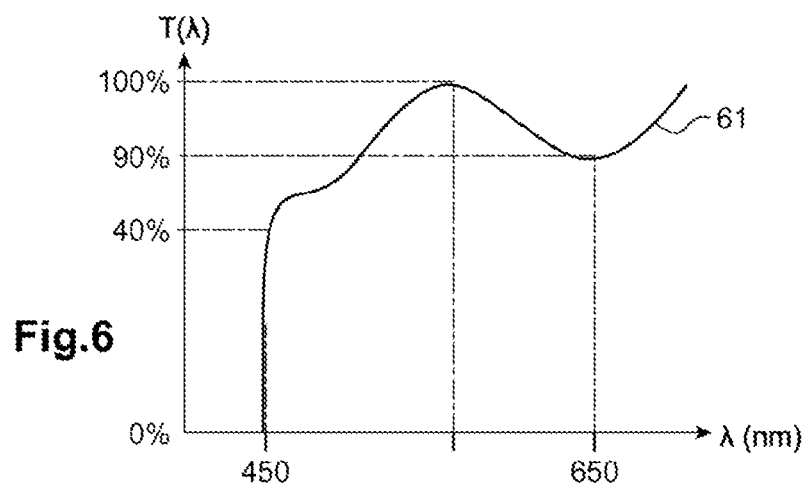

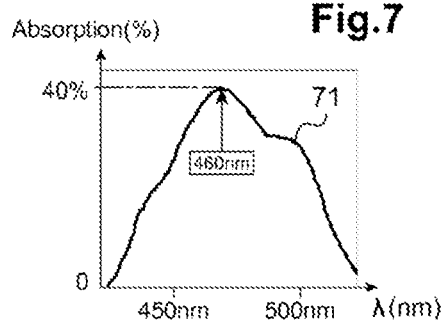
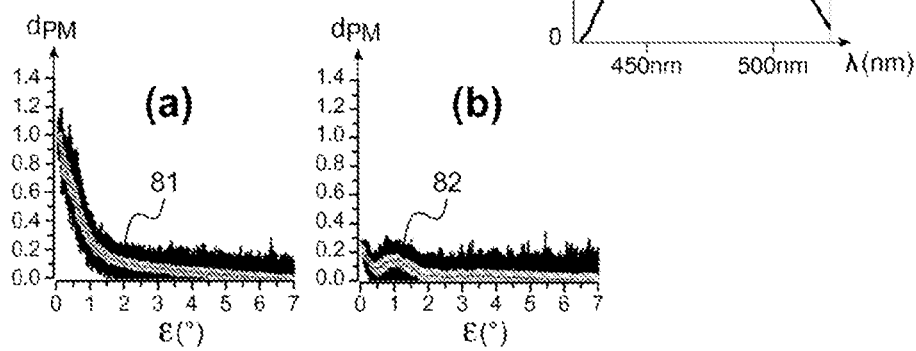
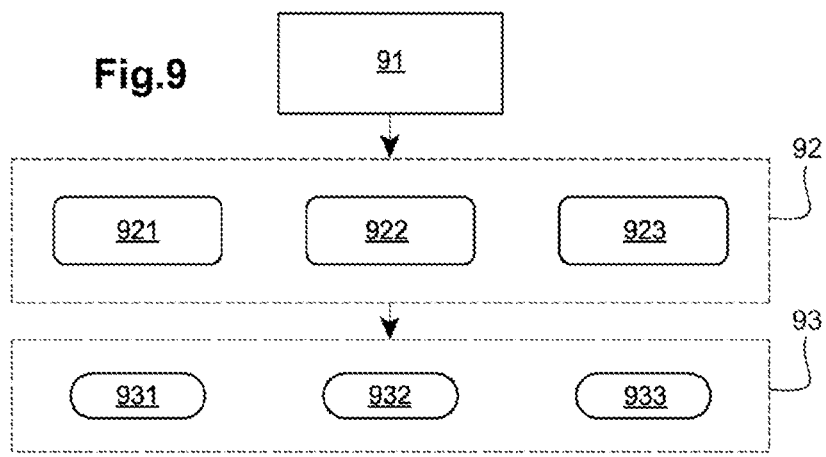
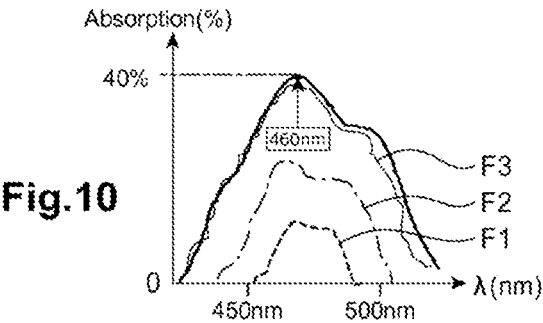

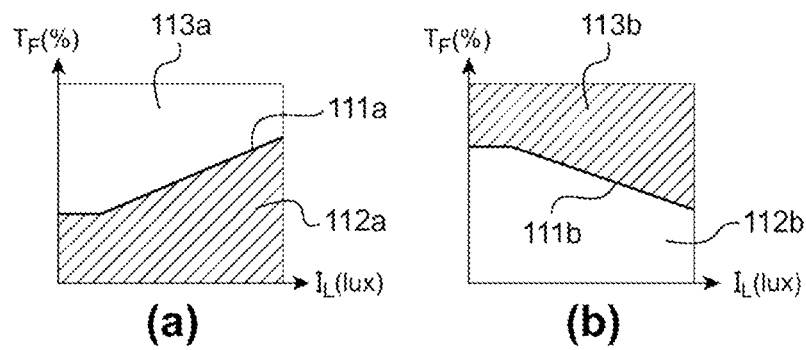
Fig. 11
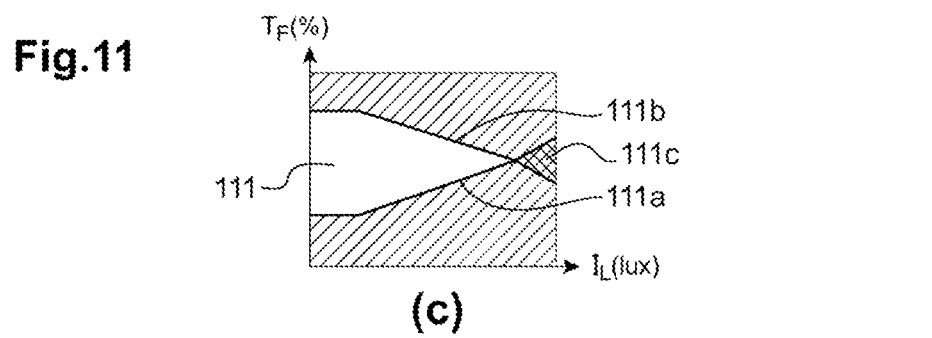
Fig. 12
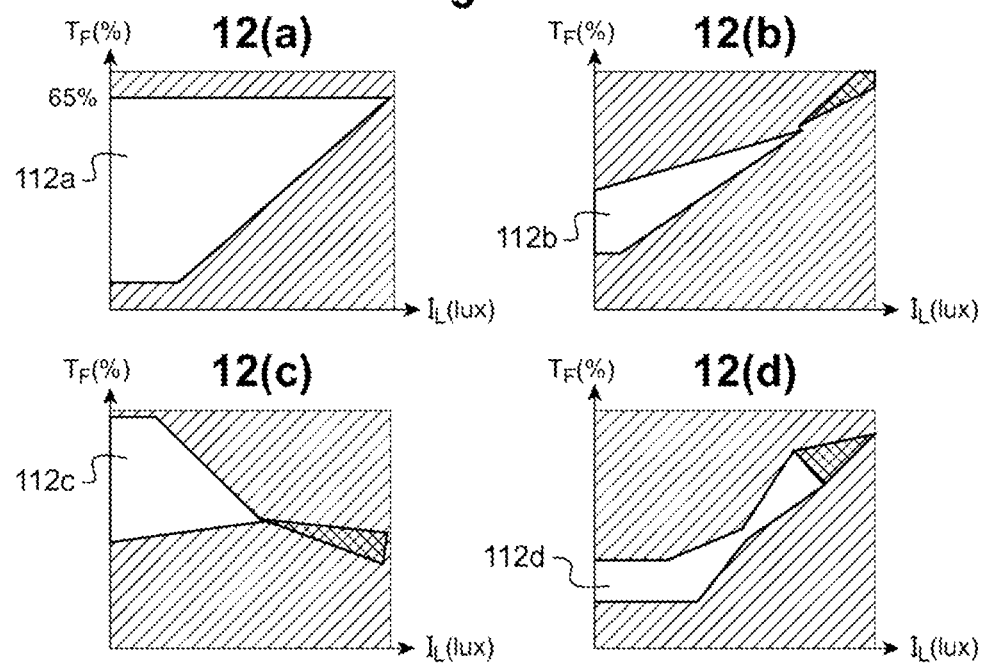

METHOD FOR DETERMINING A FILTER FOR AN OPHTHALMIC LENS AND OPHTHALMIC LENS COMPRISING SUCH A FILTER

CROSS REFERENCE TO RELATED APPLICATIONS

This application is a Continuation of application Ser. No. 16/809,793, filed on Mar. 5, 2020, which is a Continuation of application Ser. No. 15/543,795, filed on Jul. 14, 2017, which is the National Phase under 35 U.S.C. § 371 of International Application No. PCT/FR2016/050065, filed on Jan. 14, 2016, which claims the benefit under 35 U.S.C. § 119(a) to Patent Application No. 1550383, filed in France on Jan. 16, 2015, all of which are hereby expressly incorporated by reference into the present application.

TECHNICAL FIELD OF THE INVENTION

The present invention generally relates to the field of ophthalmic optics. It more particularly relates to a method for determining a filter for an ophthalmic lens intended to be placed in front of the eye of a wearer, said filter being able to improve or to maintain the visual comfort and/or visual performance of said wearer.

It also relates to a filter for an ophthalmic lens, said filter being determined by virtue of this method.

It lastly relates to an ophthalmic lens equipped with such a filter.

TECHNOLOGICAL BACKGROUND

Solutions exist that allow one or more ophthalmic lenses equipped with filters to be prescribed to a spectacle wearer.

For example, in the field of therapeutic filters, it is possible to propose to a wearer various filters or types of filter depending on his pathology (cataracts, macular degeneration, etc.).

The one or more filters are generally determined very empirically, by subjective tests, by trialing on the wearer various ophthalmic lenses equipped with filters and retaining only the one or more filters providing the greatest improvement (see for example Rosenblum et al., "Spectral filters in low-vision correction", Ophthalmic Physiol. Opt. 20 (4), pp. 335-341, 2000).

Such filters allowing the vision of contrast to be improved and/or glare to be decreased depending on the pathology are for example proposed by the ophthalmic laboratory Verbal in its CPF range of lenses (http://www.verbal.fr/fr/optique-basse-vision).

There are also solutions allowing a deficiency in the color vision of the wearer to be corrected. Document WO 2001/057583 for example describes a method in which the spectral response of the wearer is determined and a filter is produced that re-establishes a color vision close to the vision of a normal eye.

These methods for determining filters are based on procedures that are therefore:
  either subjective and do not allow the choice of the characteristics of the filter to be optimized,
  or objective but limited to the re-establishment of color vision.

During the determination of a filter, the wearer is often confronted with compromises between a plurality of criteria that he must consider: varieties of luminous environment, associated visual requirement, etc. . . .

These known determining methods thus do not make it possible to objectively take into account the sensitivity of the subject to the characteristics of a luminous environment in order to determine the filter intended to be placed in front of the eye of the wearer.

SUBJECT OF THE INVENTION

In order to remedy the aforementioned drawbacks of the prior art, the present invention proposes a determining method such as defined in the introduction, which includes:
  a step of measuring a quantity representative of a sensitivity of the eye of the wearer to said characteristic light flux, and
  a step of determining at least one optical characteristic of said filter depending on the measured representative quantity.

Thus, by virtue of the method according to the invention, the sensitivity of the wearer to the characteristics of the luminous environment is determined objectively, in order to parameterize at least one optical characteristic of the filter so as to optimize the visual performance or visual comfort of the wearer during a given task.

This visual performance and visual comfort may be limited both by the sensitivity of the wearer to the characteristic light flux, and at the same time by the very characteristics of the filter.

Depending on the visual precision required by the wearer and his capacity to manage the characteristics of the light flux, the parameters of the filter will be specifically adapted.

The sensitivity of the eye of the wearer may depend on the characteristic light flux, on the physiology of the visual system of the wearer, and on the functional impact of a given light flux on visual performance.

The complexity of the determination of the filter resides in the fact that this sensitivity to light of the eye of the wearer is dependent on:
  the characteristics of the characteristic light flux,
  the physiology of the visual system of the wearer, and
  the functional impact of a light flux adversely affecting the visual performance or visual comfort of the wearer during a given visual task.

According to one of the aspects of the invention, the characteristic light flux corresponds:
  either to a "real" light flux to which the wearer is subjected during the given task; in other words, the characteristic light flux is characteristic of the ambient luminous environment in which the wearer will be when performing the visual task;
  or to an "artificial" light flux in the sense that it at least partially reproduces the light flux to which the wearer will be subjected, and is representative of at least one light source that causes the wearer visual discomfort or to lose visual performance.

According to another aspect of the invention, the characteristic light flux is determined on the basis of a questionnaire including one or more questions asked to the wearer about the various characteristics of the light flux with which he is or will be confronted, and for which a visual discomfort or a loss of visual performance is reported.

According to one particular implementation of the determining method, said step of measuring the quantity representative of the sensitivity of the eye of the wearer to the characteristic light flux comprises:
  a step of subjecting the wearer to said characteristic light flux, and
  a step of characterizing said characteristic light flux, the measurement of said representative quantity being carried out on the wearer subjected to said characteristic light flux, Thus, the step of subjecting the wearer corresponds either to placement of the wearer in the luminous environment in which he will be liable to perform a certain visual task, or to the at least partial reproduction of this luminous environment by a characteristic light flux that is controlled so as to reproduce as closely as possible the real situation of the wearer.

According to the invention, provision is then made, in the characterizing step of the method, to characterize the characteristic light flux.

When the characteristic light flux is representative of the real luminous environment in which the wearer is, the characterization may comprise determining, of the one or more sources to which the wearer is being subjected, the main source or sources of luminous discomfort.

According to another implementation of the determining method, said step of measuring the quantity representative of the sensitivity of the eye of the wearer to the characteristic light flux comprises:
 a step of subjecting the wearer to a questionnaire allowing the sensitivity of the wearer to said characteristic light flux to be assessed,
 a step of collecting the responses of the wearer to said questionnaire, the measurement of said representative quantity being carried out on the basis of said responses of the wearer to the questionnaire, Advantageously, the step of characterizing the characteristic light flux consists in measuring at least one of the following quantities:
 the spatial distribution of said characteristic light flux,
 the angular distribution of said characteristic light flux,
 the spectrum of said characteristic light flux, and
 the intensity of said characteristic light flux, When the characteristic light flux is generated by one or more light sources, the spatial distribution of said characteristic light flux corresponds, for example, to the datum of the spatial extent of the one or more sources (point source, extended source). The angular distribution for its part corresponds, for example, to the datum of the angular emission pattern (collimated/directional source, non-directional source, etc. . . . ).

Anatomically and physiologically, a plurality of components of the eye of the wearer interact in the management of the characteristic light flux. In order to determine the appropriate filter, it is useful to take into account all of the physiological characteristics of the eye of the wearer and/or of the structures related to the eyes dealing with this light flux (multi-parametric analysis). Depending on the capacity or the fragility of this eye, the determined filter will have to relieve said eye of the light component that is not optimally or adequately managed for a given state of the eye.

It will moreover be understood that to characterize said characteristic light flux it is possible to make provision for a set of sensors, such as spectroscopes, light meters, etc. . . . , allowing the optical and photometric properties of light sources to be measured in the environment of the wearer.

It is also possible to determine by optical simulation or optical calculation the characteristics of said characteristic light flux, for example via knowledge of the theoretical response curves of the light sources.

In another step of the method, measurements relative to one or both eyes of the wearer subjected to the characteristic light flux are carried out.

More precisely, a quantity representative of a sensitivity of the eye of the wearer to said characteristic light flux is measured.

Advantageously, said quantity representative of the sensitivity of the eye of the wearer to said characteristic light flux corresponds to a sensitivity to light of said wearer.

By "sensitivity to light" of the wearer, what is meant is any relatively intense and prolonged reaction or modification of comfort or visual performance in relation to a temporary or continuous light flux or stimuli.

In certain embodiments, the quantity representative of the sensitivity of the eye of the wearer to said characteristic light flux is chosen from at least one of the following quantities:
 an objective physiological measurand of the wearer,
 an objective physical measurand of the wearer,
 a subjective measurand related to the perception or to the expression of the wearer.

By "objective physiological measurand" of the wearer, what is meant is any value relative to the measurement of at least one parameter or of at least one characteristic related to the integrity and to the operation of a component of the ocular system or of structures related to this system. The choice of such a representative quantity allows the physiological capacities of the eye or of related elements to treat all or some of the characteristics of the characteristic light flux to be evaluated. This analysis allows the conditions under or situations in which the wearer will not be able to naturally manage the light flux to be identified. The prescription of a filter will then allow the associated loss of vision and/or visual comfort to be compensated for.

By "objective physical measurand" of the wearer, what is meant is any value relative to the measurement of at least one parameter characteristic of a state of the structure and ocular functions or of the related structures via an optical and/or photometric measurement. The addition of a physical gauge allows a component of the ocular or related structure to be characterized and quantified inferentially. The choice of such a representative quantity makes it possible to quantify, via a physical measurement, the capacities and performance of one or more ocular or related structures in relation with the glare processes. Depending on the studied structure and the results obtained, the characteristics of the filter will be orientated differently in order to optimize the comfort and/or visual performance depending on the fragility/fragilities of the ocular and related structure in question.

By "subjective measurand related to the perception or to the expression" of the wearer, what is meant is all the verbal responses expressed by the wearer either in response to a questionnaire or questions in relation to performed tests, via which questionnaire the wearer is made to express what they have perceived or experienced visually. The choice of such a representative quantity allows the visual performance and/or visual discomfort experienced and expressed by the wearer to be determined subjectively. This evaluation allows the conditions under or situations in which the wearer obtains an optimal visual performance and/or an optimal comfort, and also the conditions of discomfort and loss of visual performance, to be defined.

Advantageously, the quantity representative of the sensitivity of the eye of the wearer to the characteristic light flux is chosen from at least one of the following quantities:
 the intraocular scattering coefficient of the eye of the wearer,
 the density of the macular pigment of the eye of the wearer,
 the expressed or measured maximum modification in visual comfort and/or visual performance.

The intraocular scattering coefficient of the eye of the wearer corresponds to the property that causes light to disperse in all directions in a physical structure. The effects of scattering may be caused in the eye by any optical surface (tears, the cornea, the aqueous humor, the iris, the crystalline lens and even the vitreous body). Depending on the structure of the eye of the wearer and depending on the place of the light used to characterize this measurement, the value of the scattering coefficient will be higher or lower.

This intraocular absorption or scattering is related to the loss of transparency of the ocular structure, leading light to be scattered in the eye of the wearer. This scattering increases with age and is dependent on the wavelength and orientation of the luminous target. It induces a veil, a spreading of the light reaching the retina, implying, inter alia, a visually incapacitating glare (loss of vision) and increased discomfort.

Specifically, the image formed on the retina is not focused. Spreading and dispersion of the light flux implies a blurry and diffuse image, which impacts a plurality of visual functions such as color vision, contrast sensitivity, or even visual acuity.

The density of the macular pigment of the eye of the wearer corresponds to the optical density of three carotenoids, forming the macular pigment: lutein, zeaxanthin and meso-zeaxanthin. These molecules are not synthesized by the human organism and therefore they are obtained essentially from food. These carotenoids are located locally on the macular portion of the retina, and more precisely in the axons of the photoreceptors and in the inner plexiform layer. On the cellular level, lutein is more related to rods and zeaxanthin to cones.

This macular pigment, which is located in the macular zone of the eye of the wearer, has a function protecting against phototoxic blue light of between 430 and 480 nanometers.

It also has a role in decreasing the discomforting effect of light (recovery time). The concentration of this macular pigment decreases with age and in the presence of retinal pathology. A preciser description of the role of this pigment is described in example 2 below.

By "expressed or measured maximum modification in visual comfort and/or visual performance", what is meant is any variation or drop in optimal visual performance possibly experienced by the wearer under mixed conditions, whatever the visual capacity or subjective comfort of the wearer. The expressed maximum depends on the subject (on his initial performance) and is weighted with the activities of the wearer, namely the desired vision and comfort requirements.

Specifically, an excess retinal illumination saturates the operation of the retina. This saturation engenders a visual discomfort, or even pain, and also a visual incapacity in the case of bleaching of the photoreceptors (blinding glare). A recovery time is necessary before a comfort and/or performance is regained, corresponding to the regeneration again of photoreceptor pigments.

The parameters influencing this glare depend on the characteristics of the light flux present in the luminous environment of the wearer and on the characteristics of the eye of the wearer, i.e. characteristics such as for example the diameter of the pupil, or the amount of scattering in the ocular structures (cornea, cataracts, pigment epithelium, etc.).

The light flux may impact visual performance differently depending on the wearer (variability between subjects). The filter will therefore have to be determined to preserve visual performance as best as possible. To do this, it is useful to evaluate the impact of the characteristic light flux on visual performance.

Thus, the method furthermore includes a step of evaluating the impact of said characteristic light flux on the visual performance of the wearer, in which step at least one of the following measurements is carried out on the wearer:

- visual acuity: capacity to discriminate an optotype at the smallest possible angle, such as described in the work BORISH'S CLINICAL REFRACTION, (Butterworth-Heinemann; $2^{nd}$ Edition, Oct. 27, 2006),
- contrast sensitivity: capacity of the visual system to detect differences in the luminance of static elements (spatial luminance contrast) or dynamic elements (temporal luminance contrast) of various dimensions, see for example Sidorova et al., ("Functional acuity contrast sensitivity assessment in young and middle age healthy persons at the day time with and without glare", *Acta Medica Lituanica*, Vol. 21, No. 1, 2014)
- the visual field, which corresponds to the extent of the space that the eye of the wearer perceives when it is stationary and facing straight ahead (BORISH'S CLINICAL REFRACTION, op. cit),
- color perception, i.e. the visual perception of the spectral distribution of visible light. The origin of this sensation is the stimulation of specialized nerve cells called cones that are located on the retina (op. cit.),
- distance and depth perception. Depth perception is the visual capacity to perceive the world in three dimensions and to discriminate the position of one object with respect to another (op. cit.),
- eyelid movement, which is characterized by complete or partial closure of the eyelids, and eyelid tremor following a muscular activity greater than that in the rest position. Muscular activity may be evaluated via the associated electrical activity (electromyogram), see for example Murray et al. ("*The ocular stress monitor: a new device for measuring discomfort glare*", Lighting Research and Technology, September 2002, 34:240),
- pupil diameter: size of the circular orifice located at the center of the iris and allowing, via its contraction or its dilation, the amount of light that penetrates into the eye to be controlled (cf. Alexandridis E., "*The Pupil*". Springer; 1985),
- visual discomfort on a discomfort scale: discomfort or malaise experienced with respect to a sensation following intense luminous stimuli (Mainster et al., "*Glare's causes, consequences, and clinical challenges after a century of ophthalmic study*". Am. J. Ophthalmol., 153 (4), pp. 587-593. 2012), and
- the recovery time post-glare: time required to recover all or some of the functions that were degraded by glare (Shieber, "*Age and Glare Recovery Time for Low-Contrast Stimuli Effect of glare on reaction time for peripheral vision at mesopic adaptation*"; Proceedings of the Human Factors and Ergonomics Society Annual Meeting October 1994, 38:496-499).

Visual discomfort is defined as a subjective sensation of visual non-comfort related to the amount, to the distribution and to the quality of the received light. The visual discomfort scale corresponds to a progressive graduation of the expression of visual discomfort according to various criteria (Gellatly and Weintraub, "*User reconfigurations of the de boer rating for discomfort glare*", 1990).

The retinal illuminance threshold corresponds to the amount of light received by the retina from an object or a scene by way of the pupil. Exposure to an intense luminance leads to a retinal malfunction that is the consequence of photochemical disorders in the photoreceptors, the pigment epithelium and the bipolar cells. These disorders lead to a decrease in visual performance and/or to visual discomfort. The visual-performance or comfortable retinal illuminance threshold thus corresponds to the minimum luminance level that does not lead to retinal malfunction.

In another embodiment, the quantity representative of the sensitivity to the characteristic light flux of the eye of the wearer is determined depending on the intraocular scattering coefficient measured at various wavelengths. In this case, the absorption coefficient and/or the spectral response of the filter is then adjusted depending on the intraocular scattering coefficient.

In another embodiment, the quantity representative of the sensitivity of the eye of the wearer to the characteristic light flux is determined depending on the density and/or the distribution of the macular pigment.

In one particular embodiment, the measurement of the quantity representative of the sensitivity of the eye of the wearer to the characteristic light flux is carried out by means of a test filter placed in front of the eye of the wearer, the absorption coefficient and/or the spectral response of which is made to vary. In one preferred embodiment, said at least one optical characteristic of the filter i.e. the at least one characteristic determined in the determining step, consists of:
  the absorption coefficient of said filter,
  the spectral response of said filter,
  the spatial distribution of these characteristics over said ophthalmic lens.

The absorption coefficient of the filter may be measured using the method for example described in standard ISO 8980-3:2003 "Transmittance specification and test methods".

The spectral response of the filter may for its part correspond to its reflectance $R(\lambda)$ or transmittance $T(\lambda)$, which are for example measured by means of a spectroscope using a standard D65 illuminant.

Advantageously, the optical characteristic of the filter, i.e. the characteristic determined in the determining step of the method, is the selective attenuation of the filter, this selective attenuation being proportional to the quantity representative of the sensitivity to the characteristic light flux of the eye of the wearer, i.e. the quantity measured in the measuring step.

In one particular embodiment, the optical characteristic of the filter is also determined depending on an indicator of the light flux and/or visual need to which the wearer will be subject in his activities.

When the quantity representative of the sensitivity of the eye of the wearer to the characteristic light flux is related to the density and/or distribution of the macular pigment, the spectral response of the filter is determined, in the determining step, as being in accordance with the absorption curve of the macular pigment as a function of wavelength.

In this way, it is possible by virtue of the filter determined according to this method to compensate for the effects of a decrease in the density of this pigment or indeed to mitigate a nonuniform distribution thereof in the eye of the wearer.

Advantageously, the spectral response of the filter is then determined so that the system formed by the filter and the eye of the wearer has a spectral transmittance close to the spectral transmittance of a reference eye.

In another embodiment, in the determining step, the absorption coefficient of the filter and/or the spectral response of the filter is/are determined, so that, when the wearer is subjected to a predetermined light flux, the retinal illuminance $E_{ret}$ received by the eye of the wearer is lower, at at least one wavelength, than a retinal illuminance threshold beyond which the visual comfort and/or the visual performance of said wearer is/are degraded.

This retinal illuminance threshold corresponds to the retinal illumination and is proportional to the product of the luminance $L_{sou}$ of the source and the pupillary area $A_{pup}$. This amount $L_{sou} \times A_{pup}$ defines a retinal level, the unit of which is the Troland (Td).

It may be measured using the following formula (Damelincourt et al., "Éclairage d'intérieur et ambiances visuelles", Lavoisier, 2010, ISBN 2743019115, 9782743019112):

$$E = \frac{\pi}{4} \times d^2 \times L,$$

where d is the diameter of the pupil, which depends on the luminance of the target but also on its spectral component. To do this, it is necessary to calculate the retinal illuminance while taking into account both the intensity and the spectral components of the source: $\int I*\lambda$.

Lastly, in one particularly advantageous implementation of the method of the invention, provision is made to repeat one or more times the subjecting, characterizing, and measuring steps with another characteristic light flux and to determine at least one other optical characteristic of the filter intended for the wearer.

In this way, it is then possible to take into account all the light sources liable to discomfort a wearer in the optimization of the filter.

The method according to the invention has a particularly advantageous application in ophthalmic-lens filter design.

Thus, the invention also proposes a filter for an ophthalmic lens intended to be placed in front of the eye of a wearer, said filter being determined by virtue of the method according to the invention, so as to improve or to maintain the visual comfort and/or visual performance of said wearer, In one particular embodiment, the filter is an electrochromic or photochromic active filter.

In another embodiment, this filter is a passive filter chosen from a set of predetermined filters, so that the determined optical characteristic of the filter is close to the same optical characteristic of the chosen predetermined filter.

The invention lastly proposes an ophthalmic lens intended to be placed in front of the eye of a wearer and including a filter determined by virtue of the method according to the invention.

DETAILED DESCRIPTION OF ONE EXEMPLARY EMBODIMENT

More precisely, it is proposed to detail below four exemplary methods for determining a filter according to the invention, in which examples:
  example no 1 relates to the determination of a filter depending on the scattering coefficient of the eye of the wearer at various wavelengths;
  example no 2 relates to the determination of a filter depending on the density of the macular pigment of the eye of the wearer;
  example no 3 relates to the determination of a filter depending on the prescription cone; and
  example no 4 relates to the determination of a filter depending on the comfortable retinal illuminance;

example no 5 relates to the determination of a filter on the basis of a questionnaire allowing the level of sensitivity of the eye of the wearer to a characteristic light flux to be determined.

The determining methods implemented in examples no 1 and 2 are based on a direct measurement of a physiological parameter of the eye of the wearer causing an increase in its sensitivity to light. The method then allows a filter to be designed that allows the causes of this luminous discomfort to be completely or partially compensated for.

The determining methods implemented in examples no 3 and 4 focus more on the consequences of excess light rather than the causes that are the origin of wearer glare.

The methods described below may be implemented individually or indeed combined.

The following description of the examples, which description refers to the appended drawings, which are given by way of nonlimiting example, will allow the invention and how it may be carried out to be understood.

In the appended drawings:

FIG. 1 shows a luminous target used in example no 1 to measure the intraocular scattering coefficient of the eye of the wearer;

FIG. 2 details the operating principle of the method for measuring the intraocular scattering coefficient by means of the target of FIG. 1;

FIG. 4 shows a possible curve of transmittance as a function of wavelength for a filter determined in the example no 1;

FIG. 5 shows the transmittance curves of various determined filters as a function of the intraocular scattering coefficient of a wearer;

FIG. 6 shows the transmittance curve of the filter determined in example no 1;

FIG. 7 shows the typical absorption spectrum (optical density) of the macular pigment of the eye;

FIG. 8 shows two different forms of spectral distribution of the macular pigment of an eye;

FIG. 9 is a block diagram of the method used in example no 2 to determine the filter suitable for the wearer depending on the density of the macular pigment of the wearer;

FIG. 10 shows examples of spectra of possible filters as a function of the density of the macular pigment;

FIG. 11 is a schematic explaining the method for determining the filter in example no 3 using a prescription cone;

Figure 13:
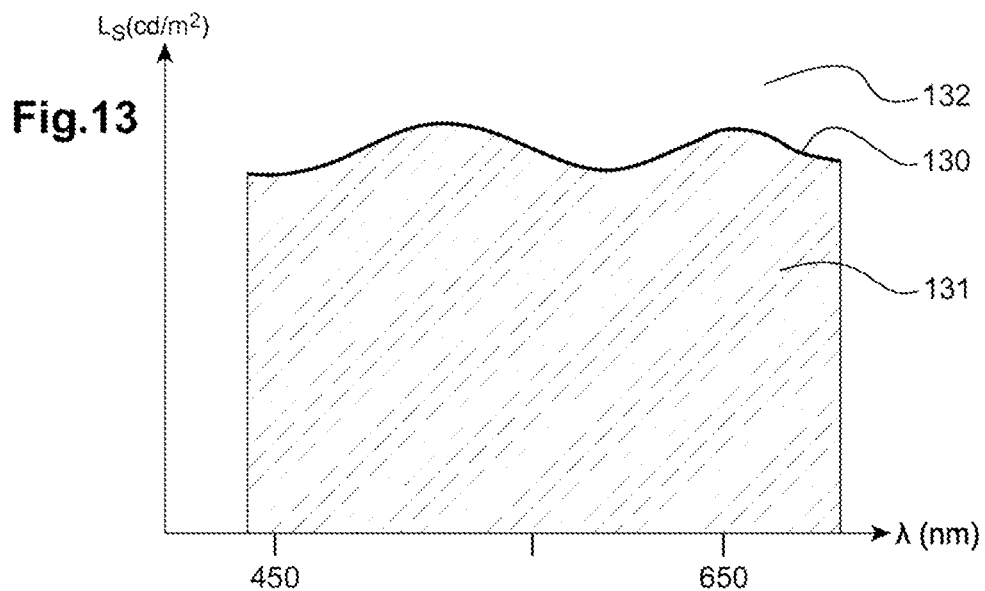
Figure 14:
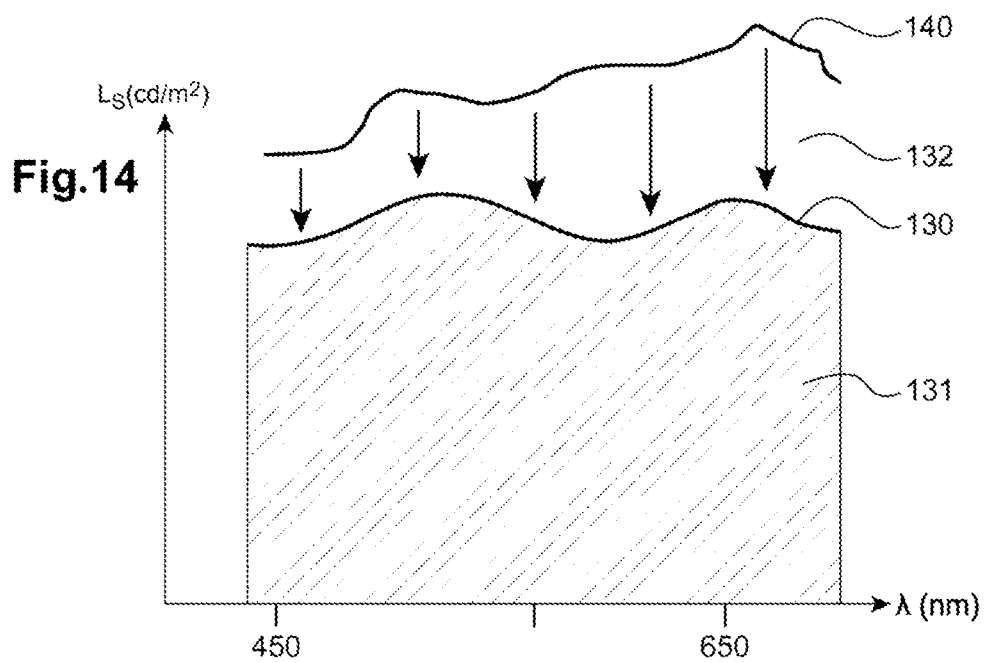
Figure 15:
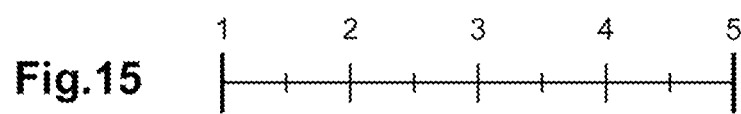

FIG. 12 gives examples of prescription cones measured in example n° 3;

FIG. 13 is a curve showing the luminance of a source at the discomfort threshold as a function of wavelength, obtained in example no 4;

FIG. 14 shows the curve of FIG. 13 with a curve of the retinal illuminance of a wearer at a given instant;

FIG. 15 shows an evaluation scale forming part of a questionnaire allowing the discomfort of a wearer in a luminous environment to be characterized.

EXAMPLE 1

Scattering, also called spatial spreading, is the property that causes matter, finely divided, to disperse light in all directions.

When the eye of a wearer is considered, this intraocular scattering may be generated by any of the optical surfaces and any of the transparent media passed through: tears, cornea, aqueous humor, iris, crystalline lens, vitreous body, and retina.

The loss of transparency of the eye of the wearer may in particular be due to the presence of opacities: cataracts, loss of transparency of the cornea (for example due to keratoconus), or of the vitreous body (floaters). These issues mainly affect elderly wearers because of the ageing of the eye, or else follow a surgical operation.

Intraocular scattering results in a degradation in visual performance, with in particular a decrease in visual acuity, in contrast sensitivity and in color vision.

Moreover, the scattering of light in the eye increases the sensitivity of the wearer to light. Specifically, scattering creates halos of light that get projected onto all of the retina and saturate in greater number the photoreceptors.

The scattering of light in the eye of a wearer depends:
on the solid angle under which the wearer sees the source and the eccentricity (angle) that the source makes with respect to the visual axis of the wearer: the closer the source is to the visual axis, the greater the scattering will be;
spectral content of the light source that is the origin of the discomfort: the intraocular scattering coefficient is higher for shorter wavelengths, for example shorter than 500 nanometers (nm), than at longer wavelengths, for example longer than 600 nm, in particular when the eccentricity of the light source is smaller than or equal to 3° with respect to the visual axis of the wearer.

In this example, it will be seen that the determining method allows a filter to be designed so as to decrease the discomfort associated with intraocular scattering in one or both eyes of a wearer.

To this end, in the measuring step the intraocular absorption or scattering coefficient of the eye of the wearer is measured. This coefficient is representative of the sensitivity of the eye of the wearer to glare and corresponds to an objective physiological measurand of this sensitivity.

Preferably, the scattering coefficient is measured at various wavelengths, for example using either a broad-spectrum source, for example a source of white light, or one or more sources of different wavelengths and limited spectrum.

In the determining step, the filter is adapted to limit the transmission of the wavelengths at which the scattering coefficient is highest in the case where the measurement is over a limited spectrum, and all of the wavelengths of the filter are modified in the case of a measurement with a broad-spectrum source.

An apparatus called "C-quant", which was developed by Oculus (see for example: http://www.oculus.de/en/products/visual-test-equipment/c-quant), and which allows the amount of light dispersed over the retina of a wearer due to intraocular scattering in the eye of the wearer to be precisely measured, is known.

Figure 1:
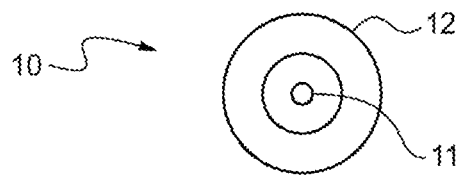

This apparatus comprises a display screen on which luminous targets 10 such as those shown in FIG. 1 are displayed. Each target comprises a central circle 11 and an exterior ring 12.

Figure 2:
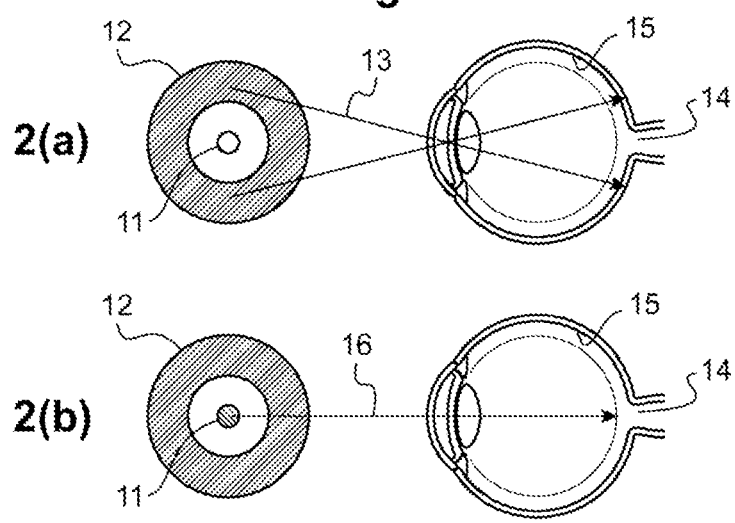

As shown in FIG. 2(a), during the measurement, the wearer looks at a target, the exterior ring 12 of which flashes. The light rays 13 originating from this exterior ring scatter on passing through the ocular media and are projected onto all of the retina 15, and in particular onto the central region 14 with which the wearer is fixating the central circle 11. The wearer then has the impression of seeing the central circle 11 also flash, because of the intraocular scattering. This impression persists even if in practice the central circle 11 remains turned off.

The light emitted 16 by the central circle 11, which flashes in phase opposition with respect to the exterior ring 12, is then adjusted (see FIG. 2(b)). Next, this light, which is called the compensating light, is increased until the subject no longer sees the difference between the flashing of the two phases. The wearer then no longer sees the flashing in the central zone 14.

The amount of compensating light that it is necessary to add to obtain the perception of equal central zones then gives a measurement of the degree of dispersion of the eye of the wearer for this type of light.

The scattering coefficient then corresponds here to the logarithmic level required to compensate the dispersion.

This coefficient, called the "Retinal Straylight Parameter", and conventionally denoted s, is given by the following formula:

$$s = \theta^2 \times (L_{eq}/E_{total}), \text{ where}$$

$\theta$ is the average radius of the exterior ring creating the scattering, $L_{eq}$ is the luminance level in cd/m² of the compensating light, $E_{total}$ is the intensity of the source creating the scattering.

The scattering coefficient s may be comprised between 0 and 2.5 log units.

In practice, the scattering coefficient cannot be zero (absence of scattering), because the eye of the wearer is not a perfect optical system.

Figure 3:
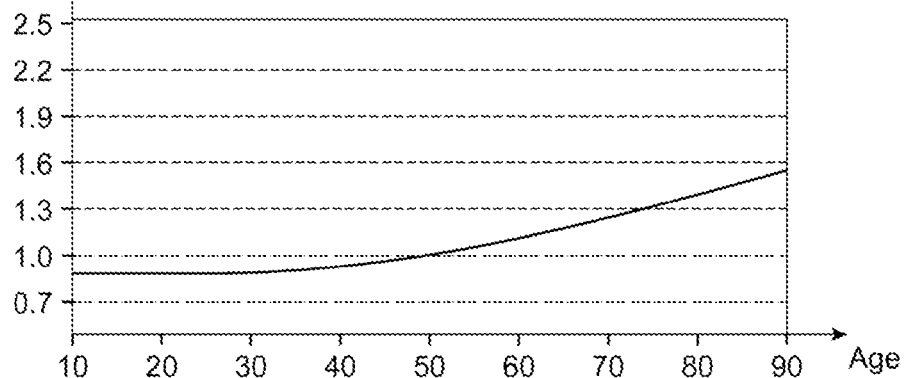
FIG. 3 is a curve showing the average intraocular scattering coefficient (log units) of a wearer as a function of his age.

Average levels of intraocular scattering as a function of age expressed in years (see FIG. 3), and certain criteria that need to be met for activities to be comfortable have been defined (see for example Van den Bergh et al., "History of ocular straylight measurement: A review", Z. Med. Phys. 2013, 23(1), pp. 6-20). For example, it has been determined that a maximum scattering coefficient of 1.5 log units is necessary to allow comfortable and effective vision during driving tasks.

A number of measurements may be carried out using the apparatus described above for various wavelengths, or various wavelength ranges, for example wavelengths or ranges located between the extreme values of the visible spectrum (400-700 nm), and/or at various eccentricities.

It is then possible to determine, by virtue of the determining method and of these measurements, the characteristics of the filter to be prescribed to the wearer, and in particular its spectral response, here the curve of transmittance $T(\lambda)$ as a function of wavelength $\lambda$.

Firstly, the measurement of the scattering coefficient at various wavelengths first of all provides information on the shape to give the transmittance curve of the filter.

Specifically, if the light at a given wavelength scatters more in comparison to another, it is advantageous to filter it proportionally more. Thus, the calculation of the difference between the scattering coefficients at various wavelengths (or the difference between two wavelength ranges) is related to the difference in the transmittance level to be prescribed at these various wavelengths.

Secondly, the very value of the intraocular scattering coefficients at the various wavelengths allows the level of the transmittance of the filter to be prescribed to be defined.

It is possible for example to consider that if a scattering coefficient is higher than normal, it is necessary to filter this wavelength.

This limit may for example be chosen to be 1.1 log units, which is the normal value for a healthy wearer of less than 45 years of age with achromatic light.

The value (in %) of the transmittance $T(\lambda)$ for a given wavelength $\lambda$ is then determined as being equal to the difference (in log units) between the intraocular scattering coefficient $s(\lambda)$ at this wavelength $\lambda$ for the wearer subjected to the characteristic light flux and the normal scattering coefficient of a wearer. Thus, the following formula is obtained: $T(\lambda) = \log[s(\lambda)] - 1.1$.

An example of an interpretation of measurements obtained by virtue of the method described above will be given below.

In the following tables, values of the scattering coefficients for the right eye and left eye of a wearer have been given.

In table no 1, the values were measured at two different wavelengths: 450 and 650 nm.

In table no 2, the values were measured in two different wavelength ranges: 450-500 nm and 600-650 nm.

The data will be interpreted only for the right eye, for the sake of simplicity.

TABLE 1

| Wavelength | Scattering coefficient Right eye | Scattering coefficient Left eye |
|---|---|---|
| 450 nm | 1.7 | 1.8 |
| 650 nm | 1.2 | 1.3 |

TABLE 2

| Wavelength | Scattering coefficient Right eye | Scattering coefficient Left eye |
|---|---|---|
| 450-500 nm | 1.7 | 1.8 |
| 600-650 nm | 1.2 | 1.3 |

The scattering coefficient at 450 nm is 0.5 log units, i.e. less scattering than the tolerated average intraocular scattering level (1.1). Thus, it is not necessary to filter this wavelength or this portion of the spectrum. The filter transmittance associated with this wavelength (or portion of the spectrum) will therefore be equal to 100%.

The transmittance $T(\lambda)$ of the filter is then determined as being such that:

$$T(450 \text{ nm}) = T(650 \text{ nm})/5.$$

It is possible to follow the same reasoning in particular for all the wavelengths of the characteristic light flux (for example for that at 575 nm with a scattering coefficient of 0.7) and to obtain a transmittance curve 41 such as shown in FIG. 4.

After the spectrum of the filter has been defined, it is recommended to define its intensity, which may be at various levels, as the curves 51, 52 and 53 of FIG. 5 illustrate.

From the values in table 1, it may be seen that the scattering coefficient at 450 nm is higher by 0.6 than the scattering coefficient defined as standard for a normal wearer (1.1). This means that it is necessary to remove $(1.7-1.1) \times 100 = 60\%$ of the flux at this wavelength to obtain a transmittance equal to 40% at this wavelength.

In the same way, since the scattering coefficient at 650 nm is equal (in log units) to 1.2, it is necessary to remove (1.2−1.1)×100=10% of the light at this wavelength, to achieve a filter transmittance equal to 90%.

Finally, a filter to be prescribed to the wearer, the spectral response 61 of which, here its transmittance as a function of wavelength, is shown in FIG. 6, is determined.

In the case of use of a broad-spectrum source, it is possible to determine average scattering coefficients for all the wavelengths and to apply a given transmittance value to all of the spectrum of the filter using the same formulae.

Thus, the spectrum of the lens will have to have characteristics such as below:
- if this type of lens is already commercially available, it may be prescribed;
- if this type of lens is not commercially available, it may be manufactured in a personalized way;
- a programmable lens may also allow the intensity of the filter to be modified as a function of characteristics of the light to which the wearer is subjected in real-time: spectral variation in a given environment (interior versus exterior light); variation in angle of incidence of the light rays (in various spectra).

Moreover, it will be noted that there may be an asymmetry in the intraocular scattering between the right eye and the left eye. In this case, provision may be made to determine filters with different spectra for the two eyes, depending on which of the eyes of the wearer exhibits the greatest amount of intraocular scattering.

Lastly, if a map of intraocular scattering as a function of the various angles of incidence of the light is obtained, it is then possible to provide lenses that are uniformly tinted over the entire lens (not graded, concentrically graded, etc.) and even to personalize the tint geometry depending on these measurements.

EXAMPLE 2

In this example, a method for determining a filter depending on the sensitivity to glare of a wearer will be described, this sensitivity being determined on the basis of measurements of the density and/or distribution of the macular pigment in the eye of the wearer.

Macular pigment (MP) is located in the macular zone of the retina, in the central 6° of retinal eccentricity c (Wolf-Schnurrbusch et al., "*Ethnic differences in macular pigment density and distribution*", Invest. Ophthalmol. Vis. Sci. 2007, 48(8), pp. 3783-3787; Bernstein PS, "*The value of measurement of macular carotenoid pigment optical densities and distributions in age-related macular degeneration and other retinal disorders*", Vision Res. 2010). It is composed of lutein and zeaxanthin (the carotenoids of the eye). It is located in the outer plexiform layer of the retina and has the role of the absorbing the light flux comprised in a specific wavelength range of between 430 and 480 nm. This macular pigment moreover has a maximum absorption peak of about 40% at a wavelength of about 460 nm.

A typical macular pigment absorption spectrum 71 is shown in FIG. 7 as a function of wavelength λ.

The role of macular pigment is to protect cellular tissues from the harmful effects of photo-oxidation caused by blue light, and to decrease the scatter of blue light by absorbing it.

With age, the density of this macular pigment, here denoted $d_{PM}$ (see FIGS. 8(*a*) and 8(*b*) for example), decreases and hence there is a strong correlation between the concentration of this macular pigment and the risk of appearance of age-related macular degeneration or "ARMD" (see for example Beatty S. et al., Invest. Ophthalmol. Vis. Sci. 2001; 42:439-446).

The spatial distribution of the macular pigment may vary depending on the wearer. The distribution may be peak-shaped (typical form 81, FIG. 8(*a*)) or toroidal-shaped (atypical form 82, see FIG. 8(*b*)). In the first type of distribution, macular pigment density $d_{PM}$ gradually decreases with eccentricity. Sometimes a central cavity is observed in the spatial distribution of the macular pigment at the macular level. A doughnut-shaped or Mexican-hat distribution is then spoken of.

Macular pigment has an impact on the visual performance of an individual: it allows, on the one hand, the impact of chromatic aberrations on vision to be decreased, and on the other hand, glare to be reduced.

Lastly, it will be noted that there is also a significant correlation between a drop in the density $d_{PM}$ of macular pigment and, on the one hand, a drop in visual acuity and contrast sensitivity and, on the other hand, an increase in the time taken to recover from luminous glare (Stringham et al., "*Macular pigment and visual performance under glare conditions*". Optom. Vis. Sci. 2008, 85(2), pp. 82-88).

Devices for measuring the density and spatial distribution of macular pigment in the interior of the eye of a wearer are known: the MPS II device (http://www.horus-pharma.com/index.php/fr/hi-tech/mpsii) from the company Horus Pharma, and the "VisuCam" device (http://www.zeiss.com/meditec/en_de/products---solutions/ophthalmology-optometry/retina/diagnostics/fundus-imaging/visucam-500.html) from the company Zeiss.

The method described below with reference to FIG. 9 makes it possible to determine a filter allowing the physiological role of this macular pigment to be compensated for, depending on its density and/or its spatial distribution. The filter determined by this method then has the same spectral absorption capacity with variable intensities depending on the density and spatial distribution of the macular pigment.

In a first operation, represented by the block 91 in FIG. 9, the density of the macular pigment of the eye of the wearer intended to receive the filter is measured.

Next, in a second operation, represented by the block 92 in FIG. 9, the needed action of the filter is segmented.

Lastly, in a third operation, represented by the block 93 in FIG. 9, at least one optical characteristic of the filter is adapted.

Block 91 (Measurement)

Macular pigment concentration may be measured by virtue of an objective physical autofluorescence measuring method such as that implemented in the Zeiss VisuCam device or indeed by virtue of the subjective method referred to as "heterochromatic flicker photometry" (Creuzot-Garcher et al., "*Comparison of Two Methods to Measure Macular Pigment Optical Density in Healthy Subjects*", Retina 2014 IOVS, May 2014, Vol. 55, No. 5, pp. 2941-2947).

Block 92 (Segmentation)

Depending on the density and spatial distribution of the macular pigment, it is possible, using the method of the invention, to determine the spectral response of the filter to be prescribed.

In this case, the quantity representative of the sensitivity of the eye of the wearer to the characteristic light flux is related to the density and/or distribution of the macular pigment.

In the determining step, the spectral response of the filter is determined as being in accordance with the absorption curve of the macular pigment as a function of wavelength.

Preferably, the spectral response of the filter is determined so that the system formed by the filter and the eye of the wearer has a spectral transmittance close to the spectral transmittance of a reference eye. By "reference eye", what is meant is a human eye the photoreceptors of which have an average sensitivity. By "close" what is meant is that the spectral transmittance of the system formed by the filter and the eye of the wearer is comprised in a predefined margin about the spectral transmittance of the reference eye. Typically, this margin may be plus or minus 15% about the spectral transmittance of the reference eye.

In other words, the spectrum of the determined filter mimics the spectrum of the macular pigment (see FIG. 10).

The intensity of the filter (see curves F1, F2, and F3 in FIG. 10) is determined depending on the value of the density of the macular pigment.

Specifically, the value of the density of the macular pigment indicates the degree of protection that must be provided to preserve the retina.

The filter then has three possible functions: compensating for, supplementing or supporting the role of the macular pigment.

These three functions allow the needed action of the filter to be segmented.

For this segmentation, either the average density of the macular pigment (for example obtained using a method such as the "heterochromatic flicker" method), or the entirety of the distribution of the macular pigment (for example obtained using a photographic method) may be considered.

In the case of the first type of method, here three segments are considered.

Segment no 1 (see block 921, FIG. 9) corresponds to a macular pigment density lower than 0.2. In this case, the filter must substantially compensate for the protective role of the macular pigment.

Segment no 2 (see block 922, FIG. 9) corresponds to a macular pigment density that is comprised between 0.2 and 0.6. In this case, the filter must supplement some of the functions of the macular pigment because the density of the latter is not optimal.

Segment 3 (see block 923, FIG. 9) corresponds to a macular pigment density higher than 0.6. In this case, the filter then has a preventive role (for example of ARMD).

Block 93 (Determination and Adaptation of the Filter)

For segment no 1, the intensity of the filter is determined (see block 931, FIG. 9) with an absorption coefficient A(λ) identical to that of the profile f(λ) of the macular pigment and a maximum absorption coefficient of 40% at a wavelength of 460 nm (see curve F1 in FIG. 10).

For segment no 2, the intensity of the filter is determined (see block 932, FIG. 9) in order to compensate for the lack of absorption by the macular pigment and in proportion to this lack: the absorption coefficient A(λ) of the filter is then defined by the relationship A(λ)=(1−d)×f(λ), where d is the macular pigment density measured in the first operation.

For segment no 3, the intensity of the filter is determined (see block 933, FIG. 9) in order to reinforce the action of the macular pigment: the absorption coefficient A(λ) of the filter is also defined by the relationship: A(λ)=(1−d)×f(λ), where d is the macular pigment density measured in the first operation.

In order to adapt the filter and to optimize the intensity of the spectrum of the filter to be prescribed, it is also possible to take into account the retinal distribution of macular pigment and spectral characteristics of the characteristic light flux.

For example, for a wearer having an atypical spatial distribution of macular pigment, provision is made to increase the absorption coefficient of the filter by an amount depending on the average density of the macular pigment and/or depending on the retinal distribution of this pigment (see Wolf-Schnurrbusch et al., op. cit.).

The distribution of macular pigment is not always a Gaussian function centered on the fovea. It may have a different shape, what is called a "Mexican-hat" shape. The filter must take the distribution of this macular pigment into account if it is to complement it as best as possible.

Provision may also be made for the filter to have a nonuniform absorption coefficient over its surface so as to match the spatial distribution of the macular pigment.

Advantageously, the filter will be an adaptive filter the absorption coefficient of which is not only non-uniform but also adjusted in real time over its surface, the absorption coefficient for example being automatically controlled by a gaze-tracking device.

It is also possible to adapt the absorption coefficient of the filter to the spectral content of the characteristic light flux. This adaptation may be static or dynamic.

EXAMPLE 3

It will be seen in this example that in the measuring step the quantity representative of the sensitivity of the eye of the wearer to the characteristic light flux corresponds to a sensitivity of said wearer to glare.

Generally, it is known that glare and wearing filters, solar filters for example, impact the vision and visual comfort of a wearer of ophthalmic lenses equipped with such filters.

By virtue of the determining method of the invention, the spectral response of the filter that allows the vision and comfort of the wearer to be optimized, whatever the intensity of the characteristic light flux, is determined.

The method also allows the spectral response of the filter, whether it be active or passive, to be personalized depending on the wearer.

The method proposed here also takes into account the refractive power of the wearer in order to obtain a measurement, which is based on and incorporates the visual performance of this wearer, of the highest possible precision.

As FIG. 11 illustrates, the determination of the spectral response of the filter is based on the use of a "prescription cone".

The general principle of this prescription-cone method will be briefly described here before the method for determining the filter is described in more detail.

In a first phase of the method, for a given luminous environment, the intensity and spectrum of the minimum filter that preserves comfort is determined.

This is illustrated in FIG. 11(*a*), in which the intensity $T_F$ of the filter as a function of light intensity $I_L$ has been shown. The determination of the minimum intensity 111*a* of the filter defines two distinct zones: a comfort zone 113*a* (upper zone) in which the wearer is not discomforted in the luminous environment when carrying out his task; and a zone of discomfort 112*a* (hatched lower zone) in which the wearer is discomforted. The visual-performance zone may also have a lower limit.

In a second phase of the method, for the same luminous environment, the intensity and spectrum of the maximum filter that maintains an optimal vision performance (for example: maintenance of visual acuity or contrast sensitivity) is determined.

This is illustrated in FIG. 11(b), in which the intensity of the filter as a function of light intensity has been shown. The determination of the maximum intensity 111b of the filter defines two distinct zones: a visual-performance zone 112b (lower zone) and a vision-loss zone 113b (hatched upper zone).

In a third phase, the two preceding approaches are combined (FIGS. 11(a) and 11(b)) to determine the prescription cone 111 (see FIG. 11(c)). This zone determines the optical characteristics of the filter (intensity, spectral response) that preserve both visual performance and visual comfort for a given wide range of luminous environments.

The zone 111c of FIG. 11(c) corresponds to a zone in which the wearer experiences both a loss of visual performance and a loss of visual comfort.

The visual-performance and comfort thresholds may be determined using an ascending or descending method. These methods take into account the time taken by the retina of the wearer to adapt to a light flux.

For the descending method, the wearer begins with the darkest lens (for a given spectrum), and the intensity of the light flux is decreased to determine the (comfort and performance) thresholds. The wearer therefore starts in a state in which the retina is not saturated.

For the ascending method, the wearer begins with the least-dark lens (for a given spectrum), and the intensity of the filter is increased to determine the (comfort and performance) thresholds. The wearer starts in a state in which he may be dazzled: the retina is oversaturated with light.

The determining method implemented in this example will be described in greater detail below.

In a first subjecting step, the wearer is placed in a luminous environment so that he is subjected to a controlled and parameterized characteristic light flux.

This characteristic light flux is characterized by:
- a light-intensity range, for example comprised between 0 and 20000 lux;
- a range of visible wavelengths, for example comprised between 400 nm and 680 nm;
- a nondirectional or directional, localized or diffuse illuminance, defined for example by a light source orientation and diameter.

For the sake of simplicity, to explain the principle of the implementation of the method, in this example only intensity variations will be considered.

The sensitivity of the eye of the wearer may be measured by varying all of the aforementioned parameters in order to more precisely characterize the glare sensitivity profile of the wearer.

It is also possible to repeat this measurement to study the effect of the spectrum of the characteristic light flux on the sensitivity of the wearer to light.

In the measuring step, the wearer looks at a target of predefined size, shape, luminance, luminance contrast, and spatial frequency (or generally any target characterizing a visual capacity, such as for example a colored target).

Preferably, the target is chosen depending on the activity of the wearer, namely on the vision requirement desired for the visual task in question. It may for example be related to the needs in terms of visual acuity, contrast sensitivity, to the precision with which colors must be rendered, etc. . . .

If necessary, the wearer wears a pair of ophthalmic lenses allowing an optimal correction (sphere and cylinder) of his refractive power.

He also wears a test-filter that is placed in front of either or both of his eyes, the absorption coefficient and/or the spectral response of this test-filter being variable.

Regarding visual performance, the measuring step is begun with a test-filter the absorption coefficient of which is high (the darkest lens).

Specifically, in the case of a measurement of visual acuity or contrast, this test-filter penalizes vision: the wearer no longer recognizes the target.

The wearer is then asked to decrease the absorption coefficient of the filter (possibly with the help of an operator) until he achieves a satisfactory visual perception. The visual-performance threshold has then been reached (passage from "non-sight" to "sight"). A psychophysical method may also be used to define this zone. The absorption coefficient of the filter defining this threshold is noted, this threshold bounding the zone permitting a non-degraded visual performance for the characteristic light flux in question.

This test is reiterated with characteristic light fluxes of different light intensities. Thus a curve similar to that in FIG. 11(a) is obtained.

Next, the same measurement is repeated but, rather than a vision test, the wearer is asked to identify the point from which the intensity of the characteristic light flux is discomforting or causes visual discomfort.

Similarly to above, a curve such as that in FIG. 11(b) is then obtained. Thus, a zone in which visual performance is optimal for a given range of light intensities of the characteristic light flux, and for a range of absorption coefficients of the filter, is determined. The negative effect of a filter on the visual performance of the wearer in this zone is also known.

In this prescription zone, the optical characteristics of the filter, i.e. characteristics such as the absorption coefficient or the spectral response, are then determined so that the filter achieves a balance between the comfort and visual performance of the wearer.

It is also possible to repeat these measurements while subjecting the wearer to a characteristic light flux characterized by various spectra and modified by the filter or by the light source itself. In this way, the influence of the spectrum of the characteristic light flux on the sensitivity to light of the eye of the wearer is evaluated. This allows the choice of the one or more optical characteristics of the filter to be guided.

These measurements may be reiterated while also considering other criteria such as visual comfort, color perception, movement perception, etc.

Thus, a spectral-response range allowing vision and comfort to be maintained is obtained.

Depending on the wearer, his age and his retinal sensitivity, the profile of the prescription cone will be different. The personalized measurement of this profile of sensitivity to light of the eye of the wearer, subjected to various characteristic light fluxes, orientates the personalization of the filter.

Specifically, the interpretation of the profile of the cone orientates:
- the recommended filter intensity/spectrum range to be used, depending on the variations and the luminous environment, to maintain vision and comfort,
- the choice of the technologies of the filters:
  - passive filters, of fixed tint and with a constant absorption coefficient whatever the intensity of the characteristic light flux;
  - active filters of the photochromic lens type the absorption coefficient and/or spectral response of which varies as a function of the light intensity, energy characteristics (UV) and/or spectrum of the characteristic light flux;

active filters of the electrochromic lens type the absorption coefficient and/or spectral response of which varies nonlinearly as a function the light intensity and/or the spectrum of the characteristic light flux in order to guarantee a good balance is achieved between the vision and comfort of the wearer.

Below, with reference to FIGS. 12(a) to 12(d), a few examples of prescription cones obtained by virtue of the method presented above will be described.

FIG. 12(a) shows a relatively large comfort zone 112a. A passive filter, for example having a fixed transmittance of 65%, ensures an optimal comfort and vision performance, whatever the luminous conditions.

FIG. 12(b) shows a comfort zone 112b with a linear progression between the absorption coefficient $T_F$ of the filter and the light intensity $I_L$ of the characteristic light flux. In this case, a lens with a photochromic filter is to be recommended.

FIG. 12(c) shows a protection zone 112c with filter, the tint of which is limited. The wearer is very sensitive to light. The discomfort threshold is quite high. The wearer requires a filter even at low light intensities. When the light intensity increases, the wearer quickly enters into a zone of discomfort and vision loss, even with a given filter. A passive filter is to be recommended, for example with a transmission factor higher than 30% for low intensities. Next, a combination of filters or pieces of equipment is to be recommended.

FIG. 12(d) shows us a narrow and non-linear prescription zone 112d, for which only a electrochromic lens could meet the needs of the wearer. The absorption coefficient of the filter must be adapted differently to various light intensities. The filter absorption coefficient ranges are also narrow for each light intensity of the characteristic light flux. It is essential to be able to select a given intensity with precision (need for the intensity of the filter to be highly modulable). One filter transmittance is associated with each light intensity of the characteristic light flux, in order to maintain a good vision/comfort compromise.

In the example in FIG. 12(d), it is also possible to envision prescribing two passive filters corresponding to two different light intensity ranges of the characteristic light flux:
  an inside filter for a light intensity lower than 400 lx for example with a transmittance of 15% allowing the wearer to be relieved and his vision to be preserved, and
  an outside filter, for a light intensity higher than 4000 lx for example with a transmittance equal to 65% to meet the needs of the wearer.

In the case of a lens equipped with an active filter, it is possible to determine, given the possible range of filters, the absorption coefficient and/or the spectral response to be programmed for the wearer, while taking into account the power consumption of the system so that said consumption is as low as possible, or to program the absorption coefficient and/or the spectral response in order to anticipate rapidly accessible light intensity variations depending on the activation time of the intensity-changing active system.

The prescription-cone-based method may also be implemented with a variation of:
  the spectrum of the characteristic light flux so as to evaluate the spectral response of the filter the spectrum which the wearer needs to maintain a good vision and a good comfort whatever the characteristics of the light flux;
  the spatial distribution of the characteristic light flux using a diffuse or localized light source;
  the light intensity of the characteristic light flux so as to take into account the impact of luminous transitions on the wearer.

It is in particular possible to vary these parameters so as to get closer to the actual conditions experienced by the wearer in real life.

For example, it is possible to take into account his day-to-day luminous environment, which may be different from one individual to the next (time spent outside/inside, climate, sunniness, night-time driving, etc. . . . ) so that the spectrum and the intensity or the spatial distribution are representative of these conditions.

EXAMPLE 4

In this fourth example, it is sought to determine, for a wearer subjected to a characteristic light flux, a filter that allows the retinal illuminance of the eye to be maintained below a comfortable threshold. This comfortable retinal illuminance threshold is the threshold beyond which the visual comfort and/or visual performance of said wearer are/is degraded.

In other words, it is here a question of determining the absorption coefficient and/or the spectral response of the filter that allows retinal illumination to be regulated so that it is adapted to the retinal illuminance that the wearer finds comfortable.

First of all it will be recalled that visual perception is triggered only beyond a minimum amount of light that allows the process of photo-transduction of the retinal photoreceptors (cones and rods) to be activated.

Conversely, vision may be penalized (visual incapacity) following exposure to an excessively high illuminance, leading to an over-saturation of the retina (discomfort) by inhibition of the regeneration of the visual pigments.

Thus, one of the objectives of the method described below is to determine at least one optical characteristic of a filter, for example its absorption coefficient and/or its spectral response, in order to adjust the retinal illuminance of the wearer to a threshold value that permits good regeneration of the visual pigments and a retinal illumination below the discomfort threshold.

To this end, a plurality of parameters are taken into account:
  ocular parameters: pupil diameter, dynamic illuminance range of the retina, scattering in the eye;
  properties of the characteristic light flux: the illuminance of the source and angular distribution of the light flux, solid angle and size of the source, duration of exposure.

In a preliminary phase, if necessary the wearer is equipped with a pair of ophthalmic lenses allowing optimal correction of his refractive power.

Next, the comfortable retinal illuminance threshold of the wearer i.e. comfortable in that it allows the visual comfort and/or a visual capacity of the wearer to be maintained, is defined. This threshold corresponds to the retinal illuminance that does not lead to a disruption of retinal operation related to luminous oversaturation of the photoreceptors and related structures of the eye of the wearer.

Generally, retinal illuminance E is proportional to the product of the luminance $L_s$ (in candelas per meter squared or cd/m$^2$) of the source and the pupillary area $A_P$ (m$^2$):
$E = \pi \times (A_P^2/4) \times L_s$.

The defined product $L_s \times A_P$ defines a quantity, the unit of which is the Troland (Td).

Pupillary area (diameter of the pupil) is dependent on the luminance of the source but also on its spectral content.

Thus, it is necessary when calculating the retinal illuminance $E_{ret}$ to take into account both the intensity I and the spectral components of the source (all the wavelengths A).

To do this, the methodology used is based on the same principle as the prescription-cone method. In a controlled luminous environment (for example: a parameterizable light box) the subjective discomfort threshold expressed by the wearer is determined for various combinations of intensity and spectrum of the characteristic light flux.

At the discomfort threshold expressed by the wearer, the comfortable retinal illuminance is calculated using the following formula: $E_C(I,\lambda) = \int \pi \times (A_p^2/4) \times L_S(I,\lambda)$ FIG. 13 shows an example of the type of curve 130 obtained, this curve showing, as a function of wavelength, the luminance of the source at the discomfort threshold, with below this curve the comfort zone (hatched zone) 131 and above this curve the discomfort zone 132.

To determine the filter that will adapt the retinal illuminance so that it is below the discomfort threshold, it is first of all best to evaluate whether the wearer is in the discomfort zone 132 (glare).

To this end, the light flux to which the wearer is subjected is characterized; namely its intensity, its spectrum, its spatial and/or angular distribution, and the geometry of the source are characterized. Luminance sensors, a spectroscope and a measurement of pupil diameter will allow the retinal illuminance $E_{ret}$ of the wearer (same formula as above) to be calculated for a predetermined light flux.

If the retinal illuminance $E_{ret}$ to which the wearer is subjected is lower than the comfortable retinal illuminance $E_c$ determined beforehand, then no filter is necessary.

In contrast, if the retinal illuminance $E_{ret}$ is higher than the comfortable retinal illuminance $E_c$ determined beforehand, then protection with a filter may prove to be useful.

Moreover, it will be noted that the pupil of the wearer plays an important role in the determination of the retinal illuminance because of its involvement in the regulation of the light flux entering into the eye of the wearer. The pupil diameter and analysis of the constriction/dilation of the pupil allow retinal illuminance to be quantified.

In addition, pupil diameter is dependent on the age of the wearer, on characteristics of the light (spectrum, intensity, etc.) and on the type of retinal photoreceptors stimulated by the characteristic light source (cones, rods, melanopsin receptors).

Lastly, the absorption coefficient and/or the spectral response of the filter is determined to adapt the retinal illuminance $E_{ret}$ to the comfortable retinal illuminance threshold $E_c$.

First of all, the spectrum of the filter allowing the quality of the light flux (as a function of wavelength) to be adjusted to the profile(s) of the comfortable threshold(s) of the subject is determined. The comfortable threshold is dependent both on the spectrum of the light and also on the sensitivity of the photoreceptors, which is wavelength-dependent. With age, for example, and changes to the physiological structure of the retina, it is possible for the spectral dependency of the sensitivity of our photoreceptors to change. Thus, it is important to determine for each wavelength or wavelength range a discomfort threshold in order to personalize the spectrum of the filter to the retinal sensitivity of the wearer, and to do so while taking into account other characteristics of the light with which the subject is confronted. An analysis of pupillary behavior may be one means of determining this retinal sensitivity.

Here the example of FIG. 14 is considered, this figure showing:

the curve 130 of the comfortable retinal illuminance threshold (solid curve) below which the comfort zone (hatched zone) is located; and a curve 140 of the retinal illuminance of the wearer at a given time.

Starting with this example, the spectrum and intensity of the filter are determined in the following way:

for the spectrum: the absorption coefficient of the filter is adapted as a function of wavelength to the profile of the curve 130 of threshold comfort. Here, the absorption coefficient is therefore higher in the reds than in the blues;

for the intensity: the absorption coefficient is adapted so as to decrease retinal illuminance 140 at a given time below the comfortable illuminance threshold 130. It is possible to define a percentage decrease below the comfort-zone threshold, for example 20% below, to avoid placing the wearer at his discomfort limit.

A filter having a transmittance $T(\lambda)$ (expressed in %) as a function of wavelength given by the following formula will then be chosen:

$$T(\lambda) = \int [E_c(I,\lambda)/E_{ret}(I,\lambda)] \times 100, \text{ the summation being between 450 and 650 nm.}$$

The intensity of the filter is set by a threshold to be defined, allowing the retinal illuminance to be decreased below the discomfort threshold.

If a tolerance of 20% is assumed, the filter must absorb an additional 20% (i.e. transmit 80% of the flux) and the filter F( ) is defined by the following formula:

$$F(I,\lambda) = 1 - (20/100) \times \int [E_c(I,\lambda)/E_{ret}(I,\lambda)] \times 100.$$

In order to simplify the analysis, it is possible to determine the comfortable retinal illuminance with a white light. This allows the intensity of the filter to be prescribed to be determined in the same way.

Thus, any of the following will possibly be determined:
the existing passive filter the intensity and/or spectrum of which is/are closest to said value;
a passive filter the intensity and/or spectral response of which are/is personalized;
the program of a lens that actively controls intensity and/or spectrum in order to adapt, under any circumstances, retinal illuminance depending on the luminous environment to which the wearer is subject.

Nevertheless, it will be noted that the prescription of a filter will affect pupil diameter. A dark filter will lead to an increase in pupil diameter and thus impact retinal illuminance. This effect must be taken into account in the validation of the final filter, to validate that a comfortable retinal illuminance is maintained.

Lastly, it is frequent to observe anisocoria with age, namely differences in pupil diameter between the right eye and left eye of the wearer. This situation may create an imbalance in the light flux entering into the two eyes of the wearer.

An evaluation of comfortable retinal thresholds in binocular and monocular vision will allow a different filter spectrum and intensity to be proposed for each of the two eyes, in order to rebalance the binocular visual performance and comfort of the wearer.

EXAMPLE 5

In this fifth example, the wearer is asked to complete a questionnaire allowing his level of sensitivity to light flux to be determined.

A set of questions is asked that allow the wearer to provide an indication of his level of visual comfort or visual quality under various luminous conditions, for example at night, at sunset, during the day, when it is sunny, cloudy, etc. and depending on the activity that he is performing, for example when he is driving, reading, carrying out a sporting activity or an activity inside or outside.

By way of example, the wearer may provide an indication on an evaluation scale of between 1 and 5, such as for example shown in FIG. 15.

On this scale, the various levels are as follows:
level "1": unbearable level of visual comfort or very low level of visual quality;
level "2": distracting level of visual comfort or mediocre level of visual quality;
level "3": just about bearable level of visual comfort or just about acceptable level of visual quality;
level "4": satisfactory level of visual comfort or level of visual quality;
level "5": excellent level of visual comfort or level of visual quality.

Thus, it is possible to determine, depending on the responses, a sensitivity profile of the wearer. It is then possible to determine the sensitivity level in a number of ways.

According to a first method, it is possible to envision generating a database of filter wearers for whom the levels of sensitivity to light have been measured, for example using a protocol such as described in one of examples 1 to 4 above, and for whom sensitivity profiles have been determined with an identical questionnaire.

It is then possible to associate with the wearer the level of sensitivity to light of wearers in the database having the same sensitivity profile, and to propose filters determined according to examples 1 to 4.

According to a second method, the level of sensitivity indicated by the wearer for the various luminous conditions and the various activities asked about may be considered to be a direct measurement of his sensitivity. Thus, for example, if the wearer indicates that he feels discomfort under normal luminous conditions, then the level of transmission of the filter may be determined directly by the level of discomfort.

For example, for a discomfort level of "1" on the scale in FIG. 15 (unbearable visual discomfort), a filter having a transmittance of 10% may be recommended. In contrast, for a discomfort level of "5" on the scale in FIG. 15 (no discomfort, excellent visual quality), a filter having a transmittance of 90% may be recommended.

In any case, the responses to the questionnaire may be weighted depending on the wearer and depending on the frequency with which he encounters the situation corresponding to the question.

For example, if a wearer spends more time outside than inside, the questions relating to outside luminous conditions are given more weight.

To this end, it is possible to ask the wearer to associate, with each question, a coefficient giving the frequency with which the situation is encountered, for example a coefficient of 1 for a rare situation, a coefficient of 2 for an occasional situation, a coefficient of 3 for a frequent situation, and a coefficient of 4 for a very frequent situation.

Generally, whatever the method used (examples 1 to 5), the determination of the filter using one of the described methods may imply use of a filter the transmittance of which varies spatially over the ophthalmic lens.

Specifically, since it is possible for sources of glare to be located in expected directions in the environment of the wearer, it is possible to envision use of a filter having an absorption coefficient and/or a spectral response that are/is different in the upper and lower portions of the ophthalmic lens.

On the one hand, the upper portion is mainly used during outside activities, when the light flux may be very high and when the spectrum of this flux is that of natural light.

On the other hand, the lower portion is mainly used during inside activities, when the light flux is limited and when the spectrum of this flux is often that of an artificial light.

Lastly, it will be noted that the various methods of examples 1 to 5 may be combined with one another in order to refine the determination of the optical filter.

It is in particular possible to combine the macular-pigment method (example 4) with a questionnaire (example 5) so as to obtain a profile of sensitivity to light of the eye of the wearer that is more precise and more complete.

The invention claimed is:

1. A method for determining a filter for an ophthalmic lens configured to be placed in front of an eye of a wearer, said filter being configured to improve or to maintain one or more of a visual comfort and a visual performance of said wearer, the method comprising:
   measuring a quantity representative of a sensitivity of the eye or both eyes of the wearer to a characteristic light flux;
   asking the wearer about various activities to which the wearer may be subjected, the wearer selecting one activity from the various activities, each of the various activities corresponding to a different luminous environment, the one activity corresponding to a first luminous environment; and
   determining at least one optical characteristic of said filter depending on the measured representative quantity and the first luminous environment of the one activity selected from the various activities asked about to the wearer,
   wherein said measuring the quantity representative of the sensitivity of the eye of the wearer to the characteristic light flux comprises:
      subjecting the wearer to said characteristic light flux, and
      characterizing said characteristic light flux,
      measurement of said representative quantity being carried out on the wearer subjected to said characteristic light flux, said characterizing the characteristic light flux including measuring at least one of the following quantities:
         a spatial distribution of said characteristic light flux,
         an angular distribution of said characteristic light flux, and
         a spectrum of said characteristic light flux.

2. The method as claimed in claim 1, wherein said quantity representative of the sensitivity of the eye of the wearer to said characteristic light flux corresponds to a sensitivity to glare of said wearer.

3. The method as claimed in claim 1, wherein:
   during the asking, the wearer selects more than one activity from the various activities, each of the more than one selected activity corresponding respectively to different luminous environments, and
   at the determining, said at least one optical characteristic is determined depending on all of the different luminous environments of the than more one selected activity.

4. The method as claimed in claim 1, wherein said quantity representative of the sensitivity of the eye of the wearer to the characteristic light flux is chosen from at least one of the following quantities:
the intraocular scattering coefficient of the eye of the wearer,
the density of the macular pigment of the eye of the wearer, and
the expressed or measured maximum variation in visual comfort and/or visual performance.

5. The method as claimed in claim 4, wherein the quantity representative of the sensitivity to the characteristic light flux of the eye of the wearer is determined depending on the intraocular scattering coefficient measured at various wavelengths, and
wherein one or more of the absorption coefficient and/or the spectral response of the filter is adjusted depending on said intraocular scattering coefficient.

6. The method as claimed in claim 4, wherein the quantity representative of the sensitivity of the eye of the wearer to the characteristic light flux is determined depending on one or more of the density and the distribution of the macular pigment.

7. The method as claimed in claim 6, wherein, in the determining, the spectral response of the filter is determined as being in accordance with the absorption curve of the macular pigment as a function of wavelength.

8. The method as claimed in claim 6, wherein, in the determining the filter, the spectral response of the filter is determined so that the system formed by the filter and the eye of the wearer has a spectral transmittance close to the spectral transmittance of a reference eye.

9. The method as claimed in claim 4, wherein, the quantity representative of the sensitivity of the eye of said wearer includes the density of the macular pigment, and
the following rules are applied to determine the filter depending on the result of the measurement of the density of the macular pigment:
when the density of the macular pigment is lower than 0.2: the spectral response of the filter is in accordance with the curve of the absorption of the macular pigment as a function of wavelength, said filter having at a wavelength of 460 nanometers a maximum absorption coefficient equal to 40%, and
when the density d of the macular pigment is higher than 0.2: the spectral response of the filter is in accordance with the absorption curve $f(\lambda)$ of the macular pigment as a function of wavelength $\lambda$, the absorption coefficient $A(\lambda)$ of said filter at the wavelength $\lambda$ being such that: $A(\lambda)=(1-d)*f(\lambda)$.

10. The method as claimed in claim 4, wherein the quantity representative of the sensitivity to the flux of the eye of the wearer is the retinal illuminance $E_{ret}(\lambda)$ as a function of wavelength,
wherein the method further comprising determining the comfortable retinal illuminance $E_{comfort}(\lambda)$ of said wearer as a function of wavelength, and, when said retinal illuminance $E_{ret}$ is higher than said comfortable retinal illuminance $E_{comfort}$ at at least a plurality of wavelengths, the filter is determined by its spectral response $F(\lambda)$ which is then equal to the product of a predetermined constant $\alpha$ and the ratio of the comfortable retinal illuminance $E_{comfort}(\lambda)$ to the retinal illuminance $E_{ret}(\lambda)$ of said wearer without filter, that is $F(\lambda)=\alpha\times(E_{comfort}(\lambda)/E_{ret}(\lambda))$.

11. The method as claimed in claim 1, wherein said measuring the quantity representative of the sensitivity of the eye of the wearer to the characteristic light flux comprises:
subjecting the wearer to a questionnaire allowing the sensitivity of the wearer to said characteristic light flux to be assessed, and
collecting the responses of the wearer to said questionnaire,
the measurement of said representative quantity being carried out based on said responses of the wearer to the questionnaire.

12. The method as claimed in claim 1, wherein the characterizing said characteristic light flux consists in measuring the intensity of said characteristic light flux.

13. The method as claimed in claim 1, wherein said at least one determined optical characteristic of the filter consists of one or more of:
an absorption coefficient of said filter,
the spectral response of said filter,
the spatial distribution of the absorption coefficient of the filter and the spectral response of the filter over said ophthalmic lens.

14. The method as claimed in claim 1, further comprising evaluating the impact of said characteristic light flux on the visual performance of the wearer by carrying out at least one of the following measurements:
visual acuity,
contrast sensitivity,
visual field,
color perception,
distance perception,
eyelid movement,
pupil diameter,
visual discomfort on a discomfort scale, and
recovery time post-glare.

15. The method as claimed claim 14, wherein the measurement of said quantity representative of the sensitivity of the eye of the wearer to said characteristic light flux is carried out by a test filter placed in front of the eye of the wearer,
wherein one or more of the absorption coefficient and the spectral response of the test filter is made to vary.

16. The method as claimed in claim 1, wherein a selective attenuation of the filter is proportional to the quantity representative of the sensitivity to the characteristic light flux of the eye of the wearer.

17. The method as claimed in claim 1, wherein said optical characteristic of the filter is determined depending on one or more of an indicator of the light flux and a visual need to which the wearer will be subject in the activities of the wearer.

18. The method as claimed in claim 1, wherein, in said determining, one or more of an absorption coefficient of the filter and a spectral response of the filter is determined so that, when the wearer is subjected to a predetermined light flux, the retinal illuminance $E_{ret}$ received by the eye of the wearer is lower, at at least one wavelength, than a retinal illuminance threshold beyond which the one or more of the visual comfort and the visual performance of said wearer is degraded.

19. A filter for an ophthalmic lens configured to be placed in front of an eye of a wearer, said filter being determined by the method as claimed in claim 1, to improve or to maintain one or more of a visual comfort and a visual performance of said wearer.

20. The filter as claimed in claim 19, wherein said filter is an electrochromic or photochromic active filter.

21. The filter as claimed in claim 19, wherein said filter is a passive filter chosen from a set of predetermined filters, so that the determined optical characteristic of the filter is close to the same optical characteristic of the chosen predetermined filter.

22. An ophthalmic lens configured to be placed in front of the eye of a wearer and including the filter as claimed in claim 19.

23. The method as claimed in claim 1, wherein, in the measuring the quantity representative of the sensitivity of the eye of said wearer including the density of the macular pigment, the following rules are applied to determine the filter depending on the result of the measurement of the density of the macular pigment:
when the density of the macular pigment is lower than 0.2: the spectral response of the filter is in accordance with the curve of the absorption of the macular pigment as a function of wavelength, said filter having at a wavelength of 460 nanometers a maximum absorption coefficient equal to 40%, and
when the density d of the macular pigment is higher than 0.2: the spectral response of the filter is in accordance with the absorption curve $f(\lambda)$ of the macular pigment as a function of wavelength $\lambda$, the absorption coefficient $A(\lambda)$ of said filter at the wavelength $\lambda$ being such that: $A(\lambda)=(1-d)*f(\lambda)$.

24. A method for determining a filter for an ophthalmic lens configured to be placed in front of an eye of a wearer, said filter being configured to improve or to maintain one or more of a visual comfort and a visual performance of said wearer, the method comprising:
measuring a quantity representative of a sensitivity of the eye or both eyes of the wearer to a characteristic light flux;
asking the wearer about various activities to which the wearer may be subjected, the wearer selecting one activity from the various activities, the one activity corresponding to a first luminous environment; and
determining at least one optical characteristic of said filter depending on the measured representative quantity and the first luminous environment of the one activity selected from the various activities to which the wearer may be subject,
wherein said measuring the quantity representative of the sensitivity of the eye of the wearer to the characteristic light flux comprises:
subjecting the wearer to said characteristic light flux, and
characterizing said characteristic light flux,
measurement of said representative quantity being carried out on the wearer subjected to said characteristic light flux, said characterizing the characteristic light flux including measuring at least one of the following quantities:
a spatial distribution of said characteristic light flux,
an angular distribution of said characteristic light flux, and
a spectrum of said characteristic light flux.

25. The method as claimed in claim 24, wherein:
during the asking, the wearer selects more than one activity from the various activities, each of the more than one selected activity corresponding to different luminous environments, and
at the determining, said at least one optical characteristic is determined depending on all of the different luminous environments of the more than one selected activity.

26. A method for determining a filter for an ophthalmic lens configured to be placed in front of an eye of a wearer, said filter being configured to improve or to maintain one or more of a visual comfort and a visual performance of said wearer, the method comprising:
measuring a quantity representative of a sensitivity of the eye or both eyes of the wearer to a characteristic light flux;
asking the wearer about various activities to which the wearer may be subjected, the wearer selecting one activity from the various activities, each of the various activities corresponding to a different luminous environment, the one activity corresponding to a first luminous environment; and
determining at least one optical characteristic of said filter depending on the measured representative quantity and the first luminous environment of the one activity selected from the various activities,
wherein said measuring the quantity representative of the sensitivity of the eye of the wearer to the characteristic light flux comprises:
subjecting the wearer to said characteristic light flux, and
characterizing said characteristic light flux,
measurement of said representative quantity being carried out on the wearer subjected to said characteristic light flux, said characterizing the characteristic light flux including measuring at least one of the following quantities:
a spatial distribution of said characteristic light flux,
an angular distribution of said characteristic light flux, and
a spectrum of said characteristic light flux.

27. The method as claimed in claim 26, wherein:
during the asking, the wearer selects more than one activity from the various activities, each of the more than one selected activity corresponding to different luminous environments, and
at the determining, said at least one optical characteristic is determined depending on all of the different luminous environments of the more than one selected activity.

\* \* \* \* \*